United States Patent
Putnam (10) Patent No.: US 6,505,577 B1
(45) Date of Patent: Jan. 14, 2003

(54) BIRD LAUNCHER FOR TRAINING DOGS, AND METHOD

(76) Inventor: Howard Gene Putnam, 158 Countryside Rd., Kings Mountain, NC (US) 28086-8920

( * ) Notice: Subject to any disclaimer, the term of this patent is extended or adjusted under 35 U.S.C. 154(b) by 0 days.

(21) Appl. No.: 10/067,707

(22) Filed: Oct. 19, 2001

(51) Int. Cl.[7] .............................................. B01K 15/02
(52) U.S. Cl. .......................... 119/702; 124/56; 124/61; 124/66
(58) Field of Search ............................ 119/702; 124/56, 124/61, 66; 446/429

(56) References Cited

U.S. PATENT DOCUMENTS 3,130,717 A * 4/1964 De Lossy et al.
4,784,107 A * 11/1988 Kelly
4,889,513 A * 12/1989 Paddock

FOREIGN PATENT DOCUMENTS

DE 3602178 A1 * 7/1987

OTHER PUBLICATIONS

Lucyana Strong Arm–For Retriever Training Bird Launcher; http://www.lucyana.com/strongar.htm; pp. 1–5; Webmasters@marksalot.com.
Bird Launchers, Inc.; http://www.birdlaunchers.com; pp. 1–16.
Etch–Marc Inc.; MAX 5000 Remote Bumper Launcher; http://www.etch–marc.com/; pp. 1–8.

* cited by examiner

*Primary Examiner*—Thomas Price
(74) *Attorney, Agent, or Firm*—Adams, Schwartz & Evans, P.A.

(57) ABSTRACT

A bird launcher for training dogs having a support frame, a pivot arm mounted on the support frame for pivotal movement between a bird loading position and a bird launching position, a magazine carried by the support frame for holding a plurality of birds to be launched by the pivot arm during successive movements of the pivot arm from the loading position to the launching position, a loader carried by the support frame for loading a bird from the magazine onto the pivot arm, and a power assembly such as a pressurized air supply carried by the support frame for pivoting the pivot arm with sufficient force to launch the bird by flinging it in an arc away from the pivot arm.

20 Claims, 8 Drawing Sheets

BIRD LAUNCHER FOR TRAINING DOGS, AND METHOD

TECHNICAL FIELD AND BACKGROUND OF THE INVENTION

This invention relates to a bird launcher for training dogs and a method for training dogs to retrieve birds. Some dogs instinctively retrieve objects, including birds. However, these dogs generally require training to properly carry out the various steps necessary to retrieve the bird under different circumstances and to properly return to the retrieved bird to the hunter. Training may be carried out using actual, dead birds or, more commonly, an artificial bird called a "bumper." The bumper is typically formed of a hard rubber or plastic bar to which is attached a short length of cord. The bumper may be flung by swinging the baron the end of the cord until sufficient centrifugal force has developed, and then releasing the cord to allow the bar to fly away from user and be retrieved by the dog. For simplicity, the term "bird" will be used in the application to refer both to a natural bird, bumper or other artificial lure to be retrieved by the dog.

Three known prior art devices are intended to accomplish this training function. One such device acts essentially as a slingshot, wherein a bird is launched by stretching rubber bands to supply the necessary force to project the bird the desired distance. These devices must be loaded with birds one at a time, and are quite limited in range. Another such device is essentially a mortar, and a propane/oxygen fuel is ignited within a mortar tube to launch a bird out of the tube. These devices store five hollow rubber devices, and rely on the use of flammable gases. The third device employs a shotgun shell to project a hollow device, and is limited in range. Operation is expensive and dangerous.

The present invention is relatively simple, inexpensive and easy to use. It has automated features, such as remote control operation and automatic loading from a magazine, which make the training exercise easier and more realistic. The distance of travel of the bird can by controlled by either the position of the stop bar or by the air pressure used to actuate the pneumatic cylinder.

SUMMARY OF THE INVENTION

Therefore, it is an object of the invention to provide a bird launcher which facilitates training retriever dogs.

It is another object of the invention to provide a bird launcher which permits operation by remote control.

It is another object of the invention to provide a bird launcher which automatically loads a plurality of birds from a magazine onto a launching arm.

It is another object of the invention to provide a bird launcher which can launch either real or artificial birds.

These and other objects of the present invention are achieved in the preferred embodiments disclosed below by providing a bird launcher for training dogs, comprising a support frame, a pivot arm mounted on the support frame for pivotal movement between a bird loading position and a bird launching position, a magazine carried by the support frame for holding a plurality of birds to be launched by the pivot arm during successive movements of the pivot arm from the loading position to the launching position, a loader carried by the support frame for loading a bird from the magazine onto the pivot arm, and a power assembly carried by the support frame for pivoting the pivot arm with sufficient force to launch the bird by flinging it in an arc away from the pivot arm.

According to one preferred embodiment of the invention, the support frame comprises a tripod.

According to another preferred embodiment of the invention, the power supply comprises a supply of compressed air and a pneumatic cylinder pneumatically communicating with the supply of compressed air and interconnecting the support frame and the pivot arm for acting to pivot the pivot arm relative to the support frame.

According to yet another preferred embodiment of the invention, the bird comprises an elongate weight attached by a cord to a holder by which the weight is connected to the pivot arm.

According to yet another preferred embodiment of the invention, the bird comprises an elongate weight attached by a cord to a holder by which the weight is connected to the pivot arm, and the magazine comprises an elongate frame member having an elongate slot therein for receiving a plurality of holders positioned successively in the slot for being loaded serially onto the pivot arm.

According to yet another preferred embodiment of the invention, the loader comprises a pneumatically-actuated plunger which ejects a bird from the magazine, and the pivot arm includes a shoe attached to the end thereof, the shoe having a slot therein sized and oriented in relation to the magazine to receive the holder of the bird ejected from the magazine.

According to yet another preferred embodiment of the invention, the holder comprises a flat washer to which the cord is attached.

According to yet another preferred embodiment of the invention, a radio frequency transmitter, antenna and a release actuator is provided for actuating the pneumatic cylinder and launching the birds to remotely.

According to yet another preferred embodiment of the invention, an arm stop is provided for stopping the pivot arm at the point of release of the bird.

According to yet another preferred embodiment of the invention, the pivot arm comprises a flexible plastic tube.

According to yet another preferred embodiment of the invention, the plastic tube has positioned therein a solid core for providing resilient strength to the pivot arm.

According to yet another preferred embodiment of the invention, an auditory device is provided for signalling the dog that a bird is to be launched.

According to yet another preferred embodiment of the invention, the auditory device is interconnected with the loader for permitting the bird to the loaded onto the pivot arm as the dog is alerted that a bird is to be launched.

According to yet another preferred embodiment of the invention, a bird launcher is provided for training dogs, and comprises a tripod support frame, a flexible pivot arm mounted on the support frame for pivotal, flinging movement between a bird loading position and a bird launching position, a magazine for holding a plurality of birds to be launched by the pivot arm during successive movements of the pivot arm from the loading position to the launching position, a loader for loading a bird from the magazine onto the pivot arm, and a pneumatic cylinder assembly for pivoting the pivot arm with sufficient force to launch the bird by flinging it in an arc away from the pivot arm.

According to yet another preferred embodiment of the invention, a loading actuator for loading a bird from the magazine onto the pivot arm from a position remote from the support frame.

According to yet another preferred embodiment of the invention, a method of training dogs to retrieve birds is provided, and comprises the steps of providing a bird launcher comprising a pivot arm mounted on a support frame for pivotal movement between a bird loading position and a bird launching position, a magazine carried for holding a plurality of birds to be launched by the pivot arm during successive movements of the pivot arm from the loading position to the launching position, a loader for loading a bird from the magazine onto the pivot arm, a power assembly for pivoting the pivot arm with sufficient force to launch the bird by flinging it in an arc away from the pivot arm. The launcher is utilized by loading a bird from the magazine onto the pivot arm, actuating the power assembly to cause the pivot arm fling the bird, returning the pivot arm to the loading position, loading a bird from the magazine onto the pivot arm, and repeating the above steps the desired number of times up to the number of birds in the magazine.

According to yet another preferred embodiment of the invention, the invention includes the step of actuating the power assembly from a point remote from the bird launcher.

According to yet another preferred embodiment of the invention, the method includes the step of actuating an auditory signal to alert the dog that a bird is to be launching simultaneously with loading a bird from the magazine onto the pivot arm.

According to yet another preferred embodiment of the invention, the method includes the step of actuating the power assembly for launching the bird from a position remote from the bird launcher.

According to yet another preferred embodiment of the invention, a bird launcher for training dogs is provided and comprising a support frame comprising a centrally-disposed tube with a plurality of spaced-apart and outwardly-diverging legs. The tube comprises a reservoir for holding a supply of compressed air and a pivot arm mounted on the support frame for pivotal movement between a bird loading position and a bird launching position. A magazine is carried by the support frame for holding a plurality of birds to be launched by the pivot arm during successive movements of the pivot arm from the loading position to the launching position. A loader is carried by the support frame for loading a bird from the magazine onto the pivot arm. A launch power assembly is carried by the support frame for pivoting the pivot arm with sufficient force to launch the bird by flinging it in an arc away from the pivot arm. An aiming power assembly is provided for rotating the pivot arm in an arc within a predetermined range of motion for launching birds in different directions.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENTS AND BEST MODE

Figure 1:
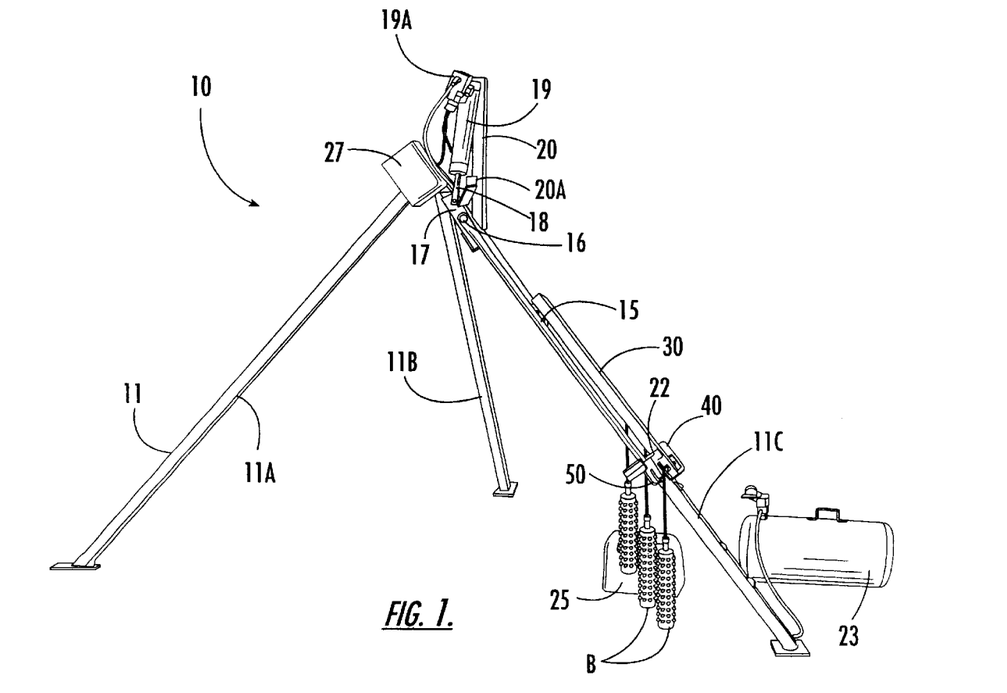
FIG. 1 is a side elevation of a bird launcher according to one embodiment of the invention.
Figure 2:
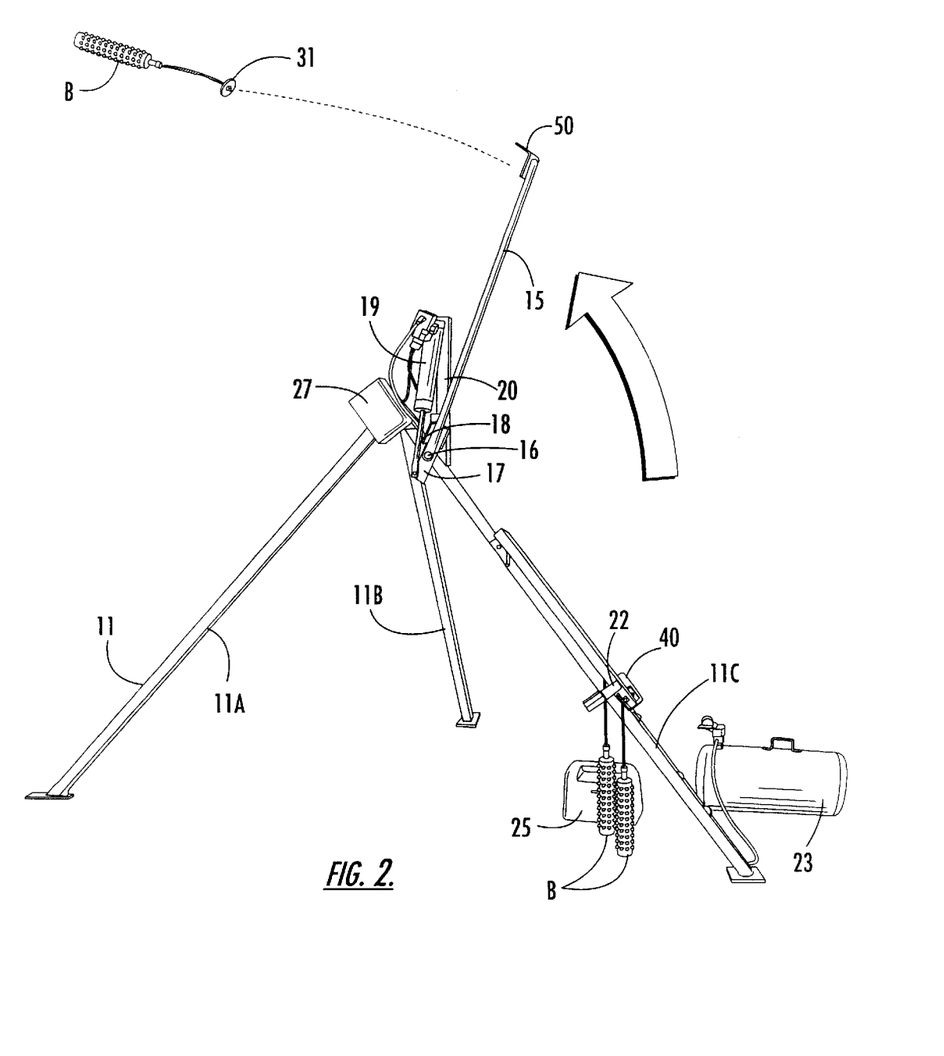
FIG. 2 is a perspective view of the bird launcher in operation in the launch position.

Referring now specifically to the drawings, a bird launcher according to the present invention is illustrated in FIGS. 1 and 2, and shown generally at reference numeral 10. Bird launcher 10 includes a support frame in the form of a tripod base 11 having legs 11A, 11B, 11C. Of course, a greater number of legs could also be used. Legs 11A, 11B, 11C are connected at the top end so as to permit the legs 11A, 11B, 11C to be folded together for transport and storage, and spread into the position shown in FIGS. 1 and 2 for use. The rear leg 11C is anchored to the ground with a ½"×6" bolt (not shown). The legs 11A, 11B, 11C may constructed to telescope in order to level the bird launcher 10 on uneven ground. At least one leg is hollow and is used as a conduit for air hoses and wiring.

A pivot arm 15 is mounted for pivotal movement on leg 11C by a pin 16. The pivot arm 15 moves between the positions shown in FIG. 1 (loading position) and FIG. 2 (launching position). The pivot arm 15 is preferably made of flexible polyvinylchloride (PVC). A double-thickness (Schedule 80) ¾" diameter PVC pipe has been found suitable. A 6" long solid nylon core is inserted in the end of the pivot arm 15 where mounted to the leg 11C and provides rigidity and additional strength at the pivot point.

A pivot bar 17 is captured between the pin 16 and pivot arm 15, together with a bearing, spacer and washer. A cylinder rod 18 of a pneumatic launch cylinder 19 is pivotally-mounted to one end of the pivot bar 17 such that movement of the piston arm 18 causes the pivot arm 15 to pivot, as described in further detail below. A suitable pneumatic cylinder 19 has an 8" stroke which rotates the pivot arm 15 117 degrees at 2300 in./lbs. of torque. The cylinder 19 is controlled by a 12 vdc, ⅜" air solenoid 19A. The launch cylinder 19 is stroked out and the pivot arm 15 activated by the solenoid. When the solenoid is turned off, gravity returns the pivot arm 15 to the load position shown in FIG. 1, where it is stopped and held in loading position by a stop bracket 22.

A stop bar 20A is attached to the cylinder mount 20 and stops the upward pivotal movement of the pivot arm 15 at the launch position.

Compressed air is supplied to the pneumatic cylinder 19 by a compressed air tank 23. The air tank 23 is preferably a 7 gallon tank rated for 125 psi, and includes a relief valve, air gauge, cut-off valve, quick connect fitting and tire stem spigot for loading air. The air tank 23 is preferably pressurized by a conventional 12 vdc air compressor 25. An enclosed electrical panel 27 is mounted on the tripod base 11 near the top and houses a remote control radio frequency transmitter, antenna, horn and terminal strip.

A magazine 30 in the form of a rectangular loader tube is mounted on leg 11C and is holds a plurality of birds "B". See FIG. 3. The birds "B" are known in the art and are available at sporting goods stores and in bird-hunting related catalogues. The bird "B" is formed of a hard rubber elongate member suspended from a cord, such as a 3/16" rope. Use of the bird "B" is facilitated by attaching to the free end of the rope a specially-designed PVC washer 31. Alternatively, actual birds can be used by securing one end of the rope to the bird's feet.

Figure 3:
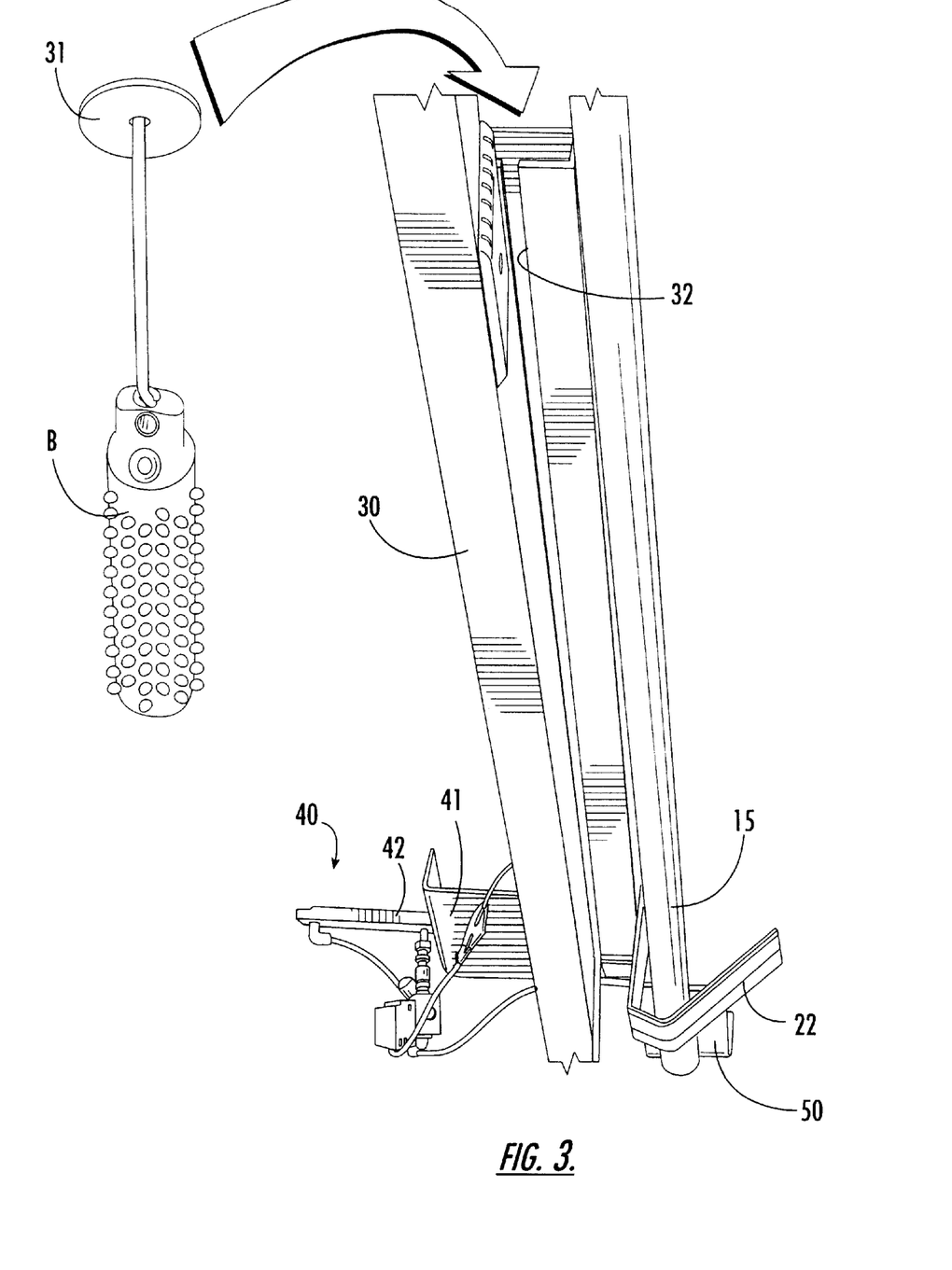
FIG. 3 is a fragmentary perspective view showing the manner of loading the birds into the magazine.
Figure 4:
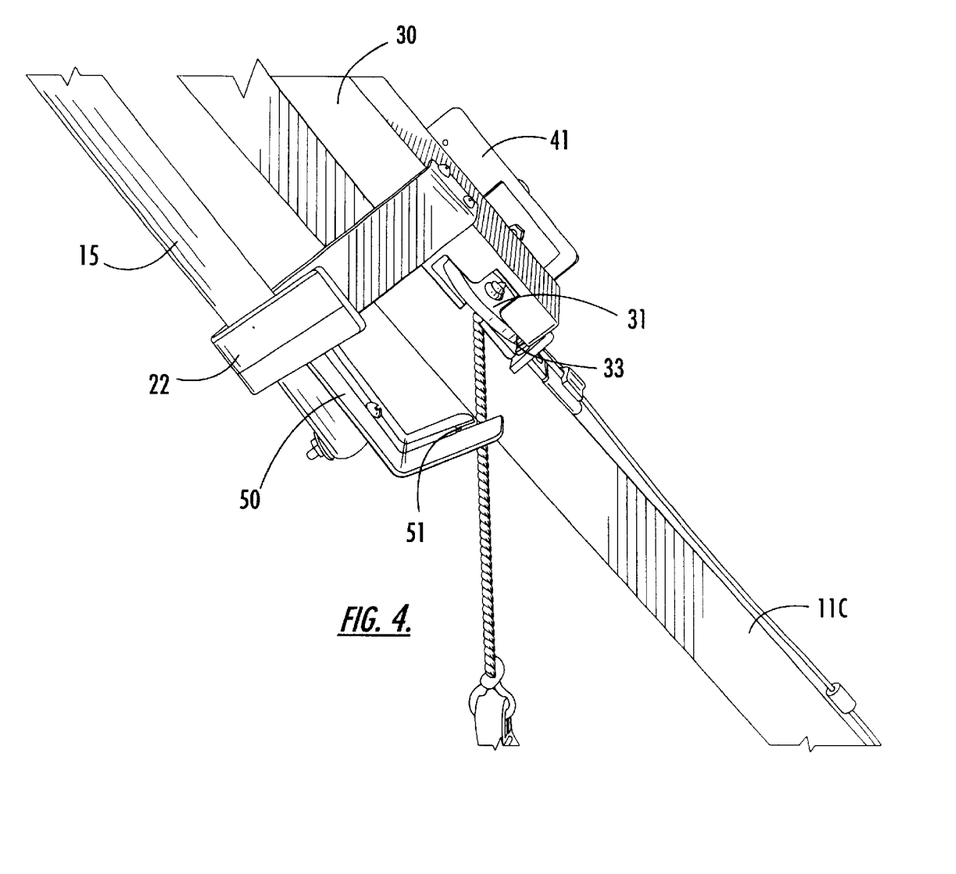
FIG. 4 is an enlarged fragmentary perspective view showing a single bird being held in a loading position at the bottom of the magazine.
Figure 5:
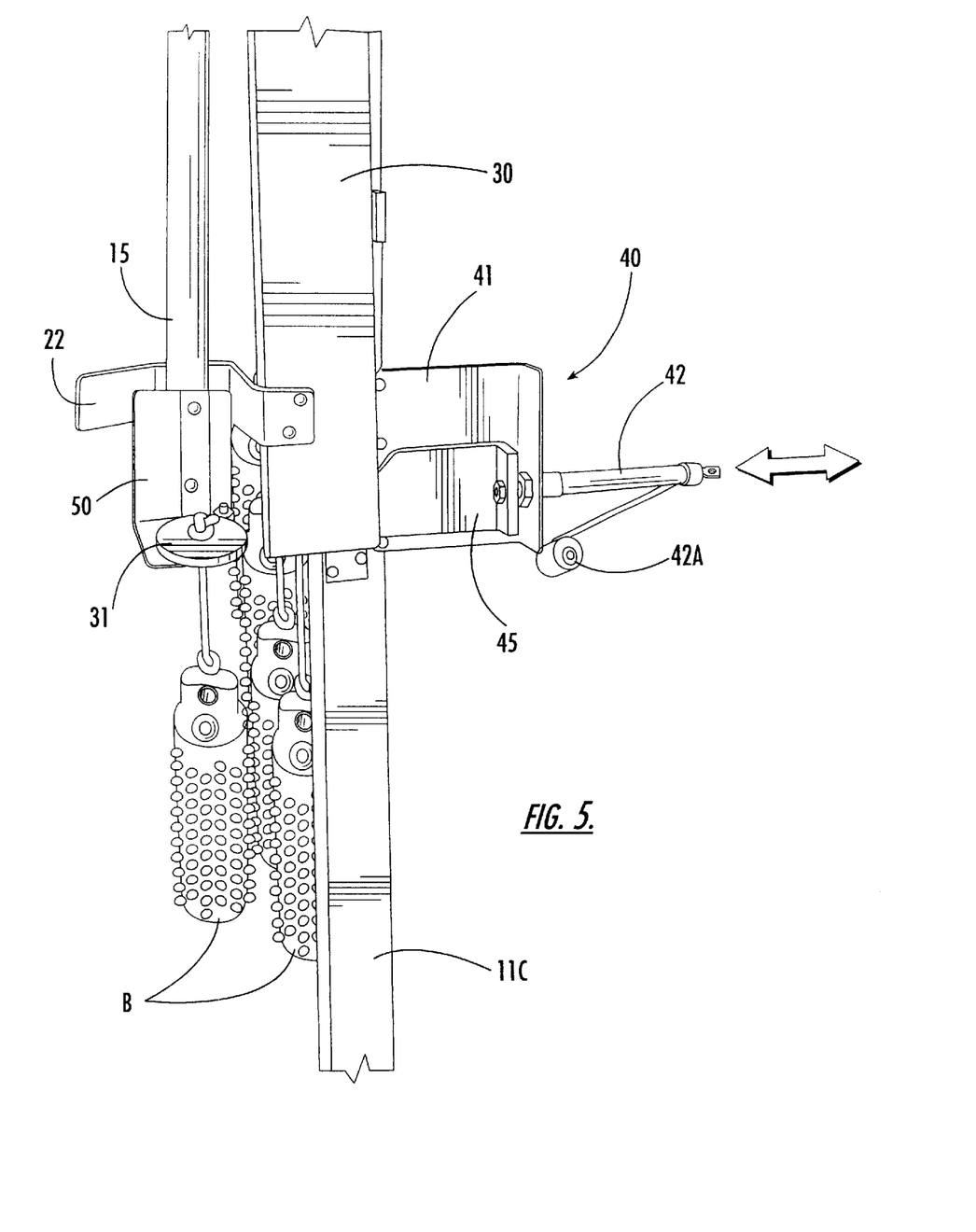
FIG. 5 is a fragmentary perspective view showing loading of a bird from the magazine onto the pivot arm.

The magazine 30 includes a ¼" slot 32 which is open to the top of the magazine and extends the length of the magazine 30. The washers 31 are placed one-by-one into the magazine 30 by placing the washer 31 in the tube with the rope extending through the slot 32. As is shown in FIGS. 3 and 4, the washer 31 is captured in the magazine 30 and is fed by gravity to the bottom of the magazine 30, which is capped. The lowermost washer 31 resides behind and in registration with a feed slot 33. As is best shown in FIGS. 3 and 5, a loader 40 loads successive birds "B" onto the end of the pivot arm 15. The slot 32 centers the washer 31 in the magazine 30. The magazine 30 will preferably accommodate up to 16 birds "B."

The loader 40 includes a bracket 41 mounted to the magazine 30 which carries a pneumatic loading cylinder 42 which is activated by a solenoid 42A. A PVC plate 45 attached to the free end of the piston rod of the cylinder 42 and pushes the lowermost washer 31 from the magazine 30 for loading. The pneumatic loading cylinder 42 is supplied with air from the air tank 23.

The free end of the pivot arm 15 is provided with an L-shaped shoe 50 which includes a slot 51. The side of the slot 51 adjacent the magazine 30 is short enough to allow the rope to pass the shoe 50 and fall into the slot 51. See FIG. 4. The washer 31 falls onto the shoe 50 and is held by gravity in place until launched.

The bird launcher 10 is controlled by a radio frequency remote control unit, not shown, which has two buttons. The bird launcher 10 is prepared for use by first spreading the legs 11A, 11B, 11C and properly securing and leveling the bird launcher 10 to the ground.

With the air turned off, the birds "B" are loaded into the magazine 30. The power supply and air line are connected and a 12-volt power supply and the air valve of the airtank are turned on, pressurizing the tank and supplying power to the electrical panel 27. At a minimum of 20 yards from the bird launcher, the first button on the remote controller is pushed, activating the horn to get the dog's attention and at the same time actuating the solenoid of the loading cylinder 42 thereby loading the lowermost bird "B" onto the shoe 50.

The second button is then pushed and held in for 3–5 seconds, activating the solenoid of the launch cylinder 19. The launch cylinder 19 extends, pivoting the pivot arm 15 upwardly in an arc until it strikes the stop bar 20A. The bird launcher "B" is flung up and away from the pivot arm 15. When the second button is released, the pivot arm 15 lowers to the loading position by gravity. By repeatedly pressing the first button and then the second button, each bird "B" is successively fed onto the pivot arm 15 while the horn sounds to attract the dog's attention, and then launched, until all of the birds "B" have been launched.

Figure 6:
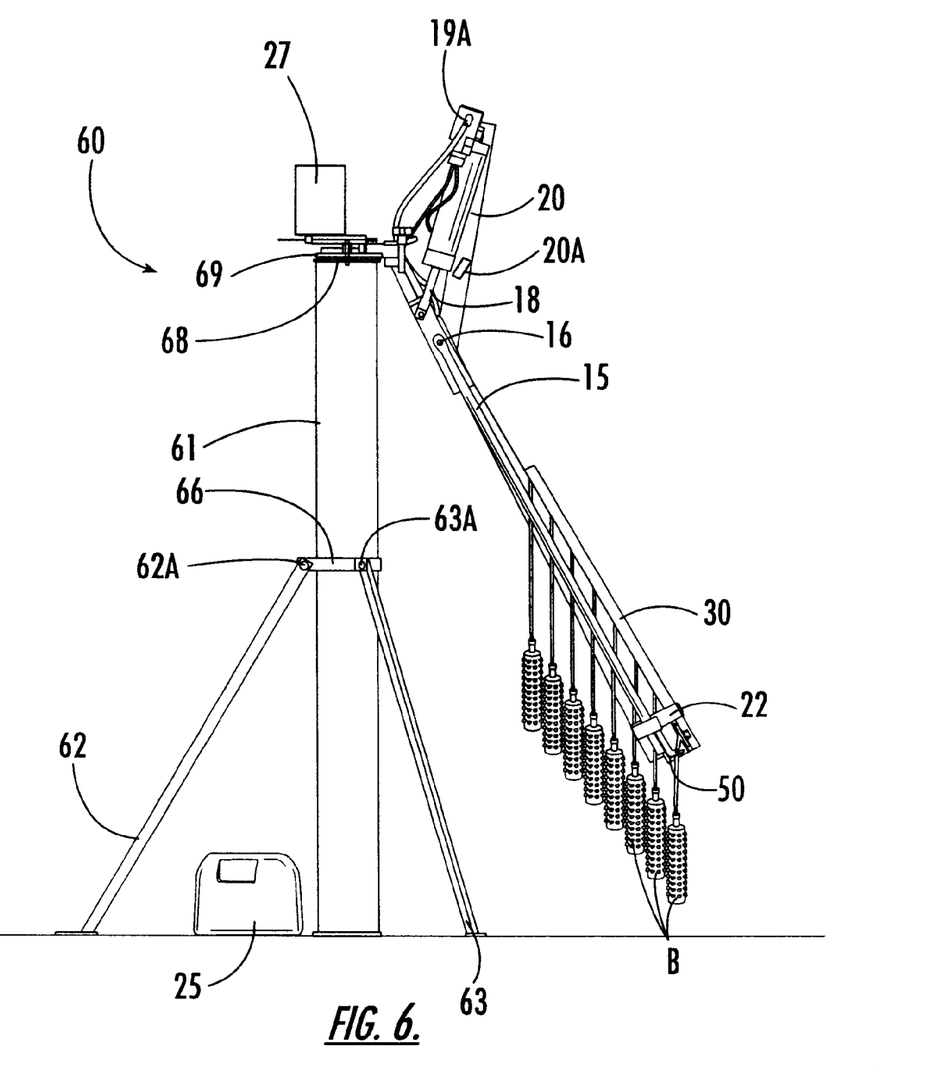
FIG. 6 is a side elevation of an alternative embodiment of the bird launcher.
Figure 7:
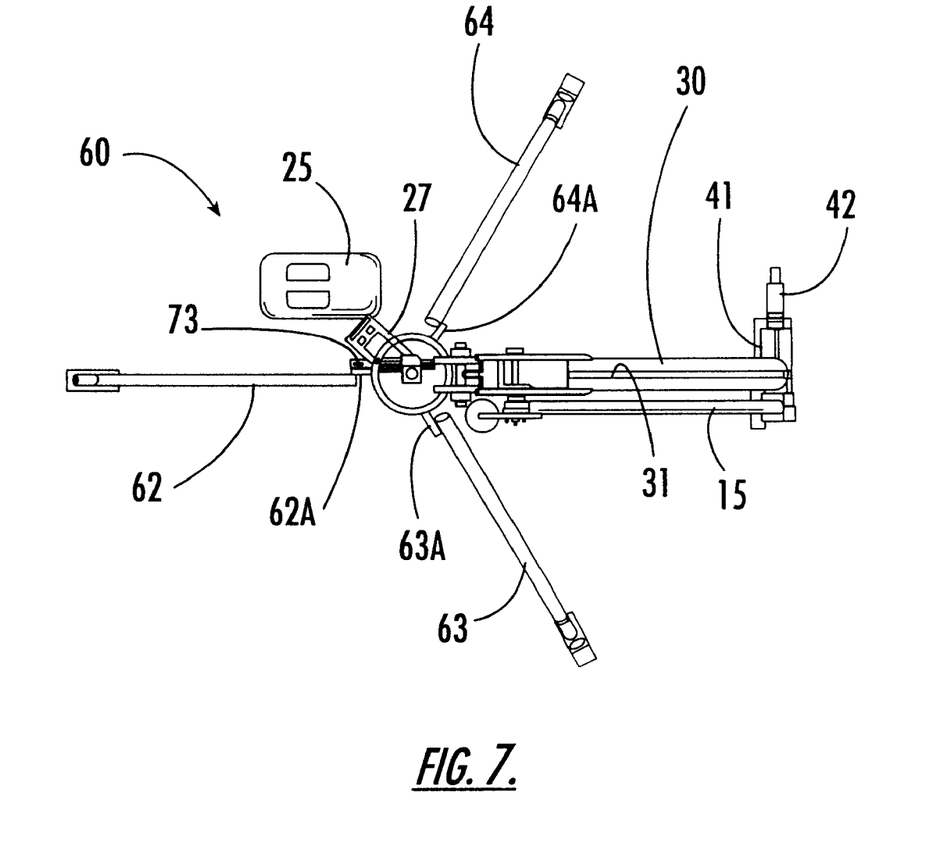
FIG. 7 is a top plan view of the bird launcher shown in FIG. 6.
Figure 8:
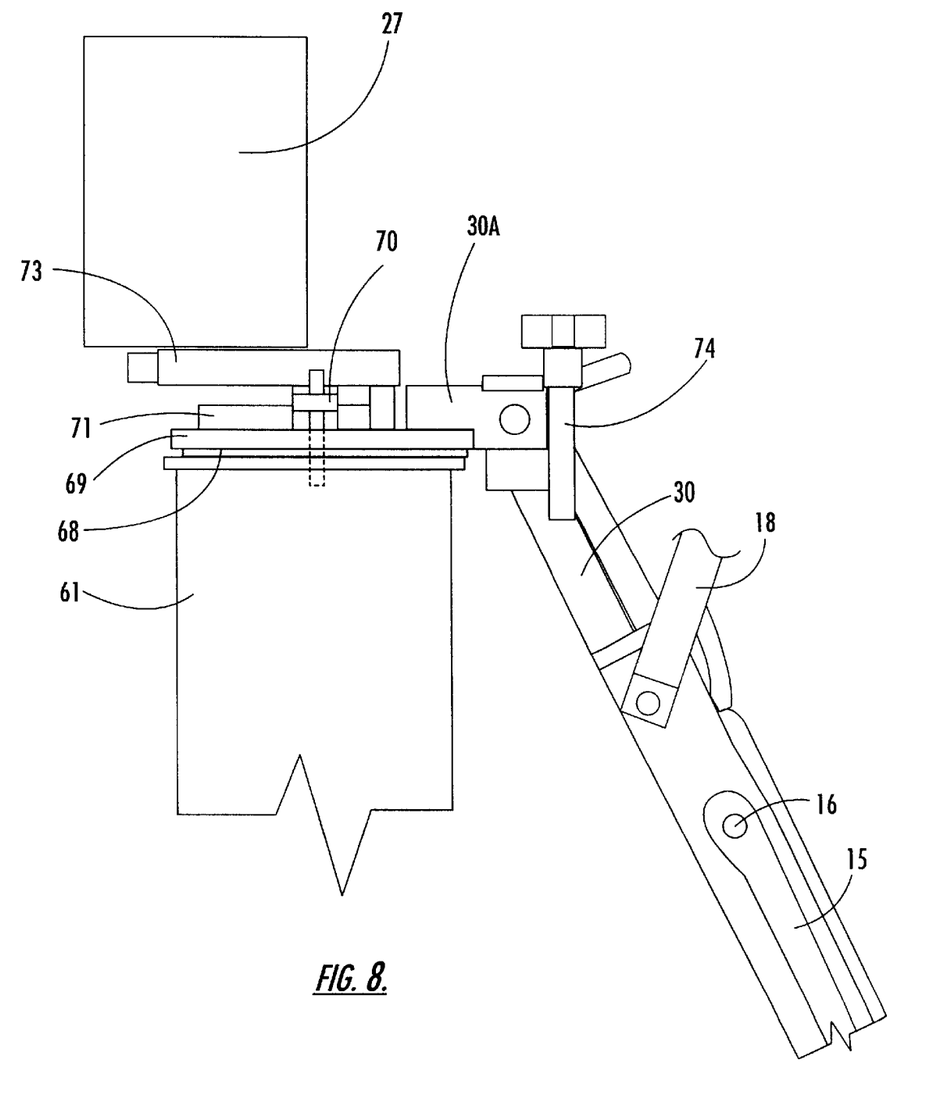
FIG. 8 is an enlarged partial side elevation view of the bird launcher shown in FIGS. 6 and 7.

Referring now to FIGS. 6, 7 and 8, an alternative embodiment of the bird launcher according to the invention is shown and indicated at reference numeral 60. Elements in common with the bird launcher 10 are indicated by like reference numerals. The bird launcher 60 is provided with an upright tubular base 61 which is sealed to function as the compressed air reservoir which supplies compressed air to operate the pneumatic cylinders, and which provides enhanced stability. The base holds air at 135 PSI and is the main support for the other components. A ⅜" coupling supplies air to the cylinders.

Three legs 62, 63, 64 are attached to the base 61 by means of a collar 66 which encircles the base 61 intermediate its upper and lower ends. Pivot brackets 62A, 63A, 64A enable the legs 62, 63, 64, respectively, to be adjusted as necessary to level the bird launcher 60 before use.

A pivot plate gasket 68 is positioned on top of the base 61. A pivot plate 69 is mounted for rotation on the pivot plate gasket 68. The pivot plate gasket 68 reduces friction as the pivot plate 69 rotates. The pivot arm 15, magazine 30 and attached members are carried by a bracket 30A mounted on the pivot plate 69 and are therefore rotated in unison with the pivot plate 69. A rotary gear 70 is mounted concentrically in the top of the base 61 and mates with a gear rack 71. A rotary cylinder 73 and rack coupler 74 connects to the gear rack 71. When the gear rack 71 is pushed and pulled by the rotary cylinder 73 it rotates the rotary gear 70, which rotates the pivot plate 69 and thus the pivot arm 15 and the magazine 30 in a counterclockwise or clockwise direction. The total amount of rotation is preferably 230 degrees.

The rotary cylinder 73 is a ¾" by 2" stroke pneumatic cylinder controlled by a dual coil ⅛" solenoid with flow control restrictors. The solenoid has a center position detent for stopping and holding the cylinder 73 from the 0–2" stroke, resulting in a 0–230 degree rotation of the pivot plate 69, as noted above. The bird launcher 60 is operated remotely by a remote control device with 4 buttons, the operation of which are described below.

The bird launcher 60 is set up by spreading the legs 62, 63, and 64 and driving a ½" bolt in the bottom of each leg into the ground and the rack coupler 74 is adjusted to the desired angle. With the air compressor 25 turned "off", the birds "B" are loaded into the magazine 30. The 12 VDC power supply is connected and turned on. A minimum of 20 yards and maximum of 500 yards from the launcher 60 button No. 1 is pressed, which activates the horn and loads the bird "B." Button No. 1 is held down for a sufficient length of time to get the dog's attention. Button No. 2 is pressed and held for 3–5 seconds to launch a bird "B", as described above. Releasing button No. 2 allows gravity to return the pivot arm 15 to its loading position. See FIG. 6.

Subsequent birds "B" can be launched by repeating the above sequences. Button Nos. 3 and 4 rotate the pivot arm 15 and magazine 30 clockwise and counterclockwise, respectively, through a range of 230 degrees. The above steps are repeated as needed to launch multiple birds "B" before releasing the dog.

A bird launcher and method are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:
1. A bird launcher for training dogs, comprising:
   (a) a support frame;
   (b) a pivot arm mounted on the support frame for pivotal movement between a bird loading position and a bird launching position;
   (c) a magazine carried by the support frame for holding a plurality of birds to be launched by the pivot arm during successive movements of the pivot arm from the loading position to the launching position;
   (d) a loader carried by the support frame for loading a bird from the magazine onto the pivot arm; and
   (e) a power assembly carried by the support frame for pivoting the pivot arm with sufficient force to launch the bird by flinging it in an arc away from the pivot arm, wherein the bird comprises an elongate weight attached by a cord to a holder by which the weight is connected to the pivot arm.

2. A bird launcher according to claim 1, wherein said support frame comprises a tripod.

3. A bird launcher according to claim 1, wherein said power assembly comprises a supply of compressed air and a pneumatic cylinder pneumatically communicating with the supply of compressed air and interconnecting the support frame and the pivot -arm for acting to pivot the pivot arm relative to the support frame.

4. A bird launcher according to claim 3, and including a radio frequency transmitter, antenna and a release actuator for actuating the pneumatic cylinder and launching the birds remotely.

5. A bird launcher according to claim 4, and including an auditory device for signaling the dog that a bird is to be launched.

6. A bird launcher according to claim 5, wherein the auditory device is interconnected with the loader for permitting the bird to be loaded onto the pivot arm as the dog is alerted that a bird is to be launched.

7. A bird launcher according to claim 4, and including a loading actuator for loading a bird from the magazine onto the pivot arm from a position remote from the support frame.

8. A bird launcher according to claim 1, and including an arm stop for stopping the pivot arm at the point of release of the bird.

9. A bird launcher according to claim 1, wherein said pivot arm comprises a flexible plastic tube.

10. A bird launcher according to claim 1, wherein said support frame comprises an upright compressed air reservoir to which are attached a plurality of outwardly extendable legs.

11. A bird launcher for training dogs, comprising:
(a) a support frame;
(b) a pivot arm mounted on the support frame for pivotal movement between a bird loading position and a bird launching position;
(c) a magazine carried by the support frame for holding a plurality of birds to be launched by the pivot arm during successive movements of the pivot arm from the loading position to the launching position;
(d) a loader carried by the support frame for loading a bird from the magazine onto the pivot arm; and
(e) a power assembly carried by the support frame for pivoting the pivot arm with sufficient force to launch the bird by flinging it in an arc away from the pivot arm, wherein the bird comprises an elongate weight attached by a cord to a holder by which the weight is connected to the pivot arm and the magazine comprises an elongate frame member having an elongate slot therein for receiving a plurality of holders positioned successively in the slot for being loaded serially onto the pivot arm.

12. A bird launcher according to claim 11, wherein said loader comprises a pneumatically-actuated plunger which ejects a bird from the magazine, and the pivot arm includes a shoe attached to the end thereof, said shoe having a slot therein sized and oriented in relation to the magazine to receive the holder of the bird ejected from the magazine.

13. A bird launcher according to claim 12, wherein said holder comprises a flat washer to which the cord is attached.

14. A bird launcher according to claim 11, wherein said support frame comprises a tripod.

15. A bird launcher according to claim 11, and including an arm stop for stopping the pivot arm at the point of release of the bird.

16. A bird launcher according to claim 11, wherein said power assembly comprises a supply of compressed air and a pneumatic cylinder pneumatically communicating with the supply of compressed air and interconnecting the support frame and the pivot arm for acting to pivot the pivot arm relative to the support frame.

17. A bird launcher according to claim 16, and including a radio frequency transmitter, antenna and a release actuator for actuating the pneumatic cylinder and launching the birds remotely.

18. A bird launcher according to claim 17, and including an auditory device for signaling the dog that a bird is to be launched.

19. A bird launcher according to claim 18, wherein the auditory device is interconnected with the loader for permitting the bird to be loaded onto the pivot arm as the dog is alerted that a bird is to be launched.

20. A bird launcher for training dogs, comprising:
(a) a support frame comprising a centrally-disposed tube with a plurality of spaced-apart and outwardly-diverging legs, said tube comprising a reservoir for holding a supply of compressed air;
(b) a pivot arm mounted on the support frame for pivotal movement between a bird loading position and a bird launching position;
(c) a magazine carried by the support frame for holding a plurality of birds to be launched by the pivot arm during successive movements of the pivot arm from the loading position to the launching position;
(d) a loader carried by the support frame for loading a bird from the magazine onto the pivot arm;
(e) a launch power assembly carried by the.support frame for pivoting the pivot arm with sufficient force to launch the bird by flinging it in an arc away from the pivot arm; and
(f) an aiming power assembly for rotating the pivot arm in an arc within a predetermined range of motion for launching birds in different directions.

* * * * *